United States Patent [19]

Lord

[11] 4,320,788

[45] Mar. 23, 1982

[54] APPARATUS FOR THE BULK DELIVERY OF VOLATILE LIQUIDS

[75] Inventor: Frank K. Lord, Huntington Beach, Calif.

[73] Assignee: Union Oil Company of California, Brea, Calif.

[21] Appl. No.: 73,903

[22] Filed: Sep. 10, 1979

Related U.S. Application Data

[60] Division of Ser. No. 589,585, Jun. 23, 1975, abandoned, and a continuation-in-part of Ser. No. 284,662, Aug. 29, 1972, abandoned.

[51] Int. Cl.³ ........................ B65B 3/18; F16K 24/00; F17C 13/00

[52] U.S. Cl. .................................... 141/290; 137/255; 137/587; 141/302; 220/85 VR

[58] Field of Search ............... 137/255, 256, 586, 587; 141/59, 285, 286, 290, 301, 302, 392; 220/85 S, 85 VR, 85 VS

[56] References Cited

U.S. PATENT DOCUMENTS

| | | | |
|---|---|---|---|
| 1,799,288 | 4/1931 | Davis | 137/586 X |
| 2,748,799 | 6/1956 | Rath | 137/587 |
| 2,928,436 | 3/1960 | Wendrow et al. | 141/290 X |
| 3,807,433 | 4/1974 | Byrd | 141/290 X |

*Primary Examiner*—Frederick R. Schmidt
*Attorney, Agent, or Firm*—Dean Sandford; Daniel R. Farrell; Alan H. Thompson

[57] ABSTRACT

Apparatus for the bulk delivery of a volatile liquid including a mobile delivery vessel having at least one compartment for the bulk storage of the volatile liquid. Each compartment has a liquid outlet controlled by a remotely controllable liquid outlet valve and a vapor inlet controlled by a remotely controllable vapor inlet valve. The opening and closing of these valves are interlocked and, optionally, the closing of the vapor inlet valve is delayed a predetermined time after the closing of the liquid outlet valve.

9 Claims, 7 Drawing Figures

APPARATUS FOR THE BULK DELIVERY OF VOLATILE LIQUIDS

This is a division of application Ser. No. 589,585, filed June 23, 1975, now abandoned, and is a continuation-in-part of application Ser. No. 284,662, filed Aug. 29, 1972, now abandoned.

This invention relates to the bulk delivery of volatile liquids, and particularly concerns a method and apparatus for reducing vapor loss to the atmosphere during bulk deliveries of volatile liquids such as gasoline.

Because of the economy of the operation, it is common practice to deliver high volume consumption liquids to the point of use or point of sale in bulk by means of tank trucks, railroad tank cars, tank ships, and barges. In the normal operation heretofore practiced, the delivery vessel is connected by means of a hose or other portable conduit to a receiving tank and the liquid pumped or gravity flowed from the delivery vessel to the receiving tank. Both the delivery vessel and the receiving tank are maintained vented to the atmosphere during the delivery operation. Hence, vapors in the receiving tank are displaced to the atmosphere by the entering liquid, and air is drawn into the delivery vessel to displace the withdrawn liquid.

While this mode of operation is satisfactory for the delivery of relatively non-volatile liquids, a number of problems are encountered in the delivery of light, low-boiling liquids which have relatively high vapor pressures under normal temperature conditions and evaporate readily, especially when agitated. Vaporization occurs at substantial rates from vessels open to the atmosphere and occurs at considerably higher rates when the liquid is agitated such as occurs during the introduction of liquid into the receiving tank. Vaporization occurs at exceedingly high rates when the liquid is introduced into the receiving tank under conditions which cause it to splash against the bottom or walls of the vessel or against the surface of the liquid therein.

Under these conditions of liquid transfer where vaporization takes place, serious hazards due to the possibility of fire and/or explosion, fume generation and air pollution present themselves. Furthermore, these volatile liquids are expensive and any vaporization loss is wasteful of materials. Often local regulations govern the type and amount of such vaporized materials which can be discharged to the atmosphere in order to minimize the possibility of air pollution or the possibility of fire or explosion.

Tank trucks and railroad tank cars, which will be hereinafter discussed by way of illustration only, have liquid capacities which vary from about 4,000 to 8,000 gallons for trucks, while railroad cars have capacities on the order of from 30,000 to 50,000 gallons. In the delivery of volatile liquids such as motor and/or aviation gasoline, depending upon the circumstances and the manner in which they are unloaded, displaced vapors evolved from the receiving tanks can amount to between about 0.5 and 5.0 gallons of vaporized material per thousand gallons of liquid delivered. Beside constituting an economic loss, there is thus generated a serious fire and explosion hazard and the vaporized product discharged into the atmosphere can contribute to pollution of the atmosphere, which is highly undesirable.

Another problem is that in handling a volatile flammable liquid such as gasoline in a closed container, the vapor space is generally too rich, i.e., has too high a concentration of gasoline vapor to be explosive. However, when the delivery vessel is emptied of the volatile liquid and air drawn into the vessel, the vapor concentration can be lowered sufficiently that the vessel is in the explosive range, thus presenting an extremely hazardous condition. Also, many refineries and bulk loading plants are equipped with vapor recovery systems which recover the vapors displaced from the delivery vessel during the loading operation. Where these displaced vapors contain a high proportion of air, the operation of the vapor recovery system can be adversely affected.

A number of different systems to contain vapors during the delivery of volatile liquids have been proposed. Of particular interest is a system disclosed in U.S. Pat. No. 2,928,436 which proposes connecting a liquid outlet of the delivery vessel to an inlet conduit extending below the surface of the liquid in the receiving tank, connecting the vapor space of the receiving tank to the vapor space of the delivery vessel through a check valve that prevents liquid in the delivery vessel from entering the vapor conduit, and providing the vent line from the receiving tank with a relief valve adjusted to open at a pressure of 0.1 to 5.0 psig. While this system is generally completely successful in preventing the escape of vapors to the atmosphere during the unloading operation, nevertheless there are certain problems encountered incident to the use of such system. Firstly, many receiving tanks are not designed to withstand a positive internal pressure of the magnitude of 0.1 to 5.0 psig. Also, particularly in the case of underground storage tanks, the current condition of the tank is not readily ascertainable and there is reluctance to impose a positive pressure on such tanks. Secondly, in the course of many transfer operations, a quantity of vapor will be generated that exceeds the volume of liquid transferred. Thus, there will be a slight compression of the vapors and the system will be under a small positive pressure of up to 0.1 to 5.0 psig depending upon the setting of the relief valve. Thus, when the connections are broken to remove the connecting hoses, vapors are discharged to the atmosphere in substantial quantity which not only contribute to air pollution, but also create a fire or explosion hazard endangering the operator and others in the immediate vicinity. Thus, need exists for a simple, low cost system for delivering volatile liquids to receiving tanks which eliminates the discharge of any substantial quantity of vapor to the atmosphere and does not incur the problems inherent in the presently proposed systems.

Accordingly, a primary object of this invention is to provide an improved method and apparatus for the delivery of volatile liquids to a receiving tank without the discharge of any substantial quantity of vapor to the atmosphere.

Another object of the invention is to provide a method and apparatus for delivering volatile liquids to a receiving tank maintained at essentially atmospheric pressure without the discharge of any substantial quantity of vapor to the atmosphere.

Still another object of this invention is to provide a movable delivery vessel for the delivery of volatile liquids to a receiving tank that accomplishes said delivery without the discharge of any substantial quantity of vapor to the atmosphere.

A still further object of this invention is to modify a motor transport for the delivery of gasoline to service stations and other delivery points that accomplishes said delivery without the discharge of any substantial quantity of vapor to the atmosphere.

Other objects and advantages of the invention will be apparent to those skilled in the art from the following description.

Briefly, the present invention comprises a mobile delivery vessel having a tank containing at least one compartment for the bulk storage of a volatile liquid, a liquid outlet means at the bottom of each compartment for removable connection to a portable liquid conduit, a positive closing valve in each outlet means to control the flow of liquid from each of the compartments, a separate vapor connection at the top of each of the compartments, a vapor conduit means for communicating each of said vapor connections to a location for removable connection to a portable vapor conduit, and a second positive closing valve at each of said vapor connections for selectively controlling the flow of vapors through each of said vapor connections. The liquid and vapor valves can be remotely operated from a convenient location, and the valves associated with each compartment can be interlocked so that the valves are opened and closed simultaneously. In one specific embodiment, time delay means are provided to close the vapor valve a short time after the corresponding liquid valve is closed to permit equalization of the pressure between the delivery vessel and the receiving tank after the delivery is terminated.

The receiving tank is provided with an inlet conduit terminating below the level of the liquid in the tank, a vapor outlet connection at the top of the receiving tank, and a vent conduit communicating the vapor space of the tank to the atmosphere. In operation, a portable conduit is connected from the liquid outlet of the delivery vessel to the inlet conduit at the receiving tank, a second portable conduit is connected from the vapor outlet of the receiving tank to the vapor conduit of the delivery vessel, and the liquid and vapor valves opened to accomplish the transfer of liquid from the delivery vessel to the receiving tank while maintaining the receiving tank at essentially atmospheric pressure during the transfer operation. Vapors are displaced from the receiving tank back to the same compartment of the delivery vessel that the liquid is withdrawn from, with little or no vapor being displaced to the atmosphere through the open vent pipe.

The method and apparatus of this invention can be used in the bulk delivery of any volatile liquid such as solvents including low molecular weight alcohols, ketones, esters, and the like, light hydrocarbon solvents such as petroleum naphtha and paint thinner; relatively low boiling internal combustion engine fuels such as motor gasoline and aviation gasoline; and the volatile jet fuels. While the method and apparatus of this invention can be applied to any mobile vessel such as motor transports, railroad tank cars, tank ships, and barges, it has particular utility in the delivery of volatile liquids by railroad tank cars and by motor transport, and is especially useful in delivering gasoline to service stations and other delivery points by motor transport. The term "motor transport" as used herein is meant to include tank trucks, tank trailers, and semitrailers.

The invention will be more readily understood by reference to the accompanying drawings, wherein like numerals refer to like parts throughout, and in which.

Figures 1, 2:
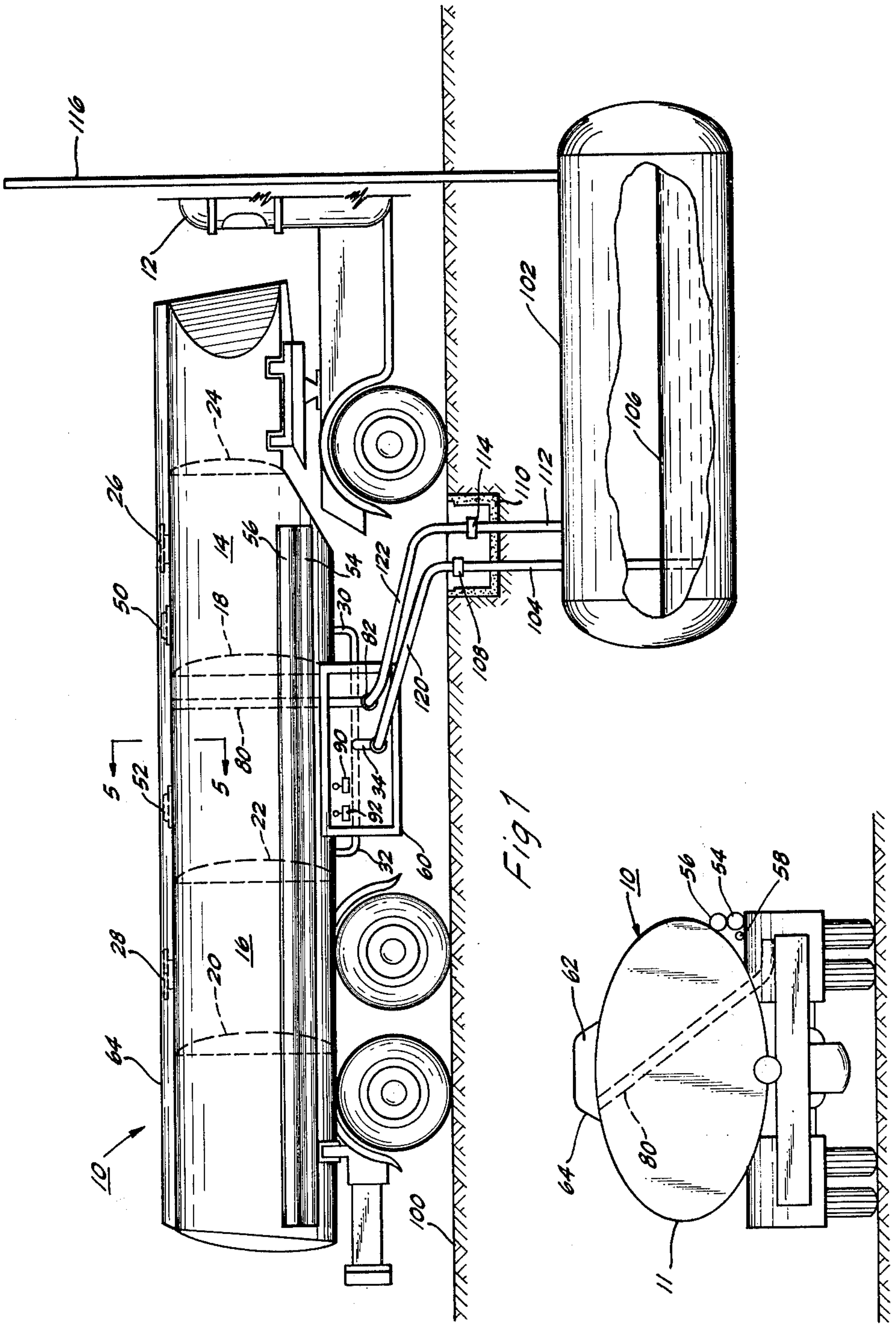
FIG. 1 is a side elevation view schematically illustrating a motor transport equipped in accordance with this invention connected to a stationary receiving tank provided with a vapor return connection.
FIG. 2 is a rear view of the motor transport showing the arrangement of the internal vapor conduit.

Referring now particularly to FIGS. 1 and 2, the apparatus shown is illustrative of the system of liquid delivery according to the present invention as applied to the delivery of gasoline from motor transports to underground storage tanks at service stations or other points of use. In the illustrated embodiment, a semitrailer 10 having an elongated tank 11 drawn by tractor 12 is provided with two separate compartments 14 and 16 separated by an internal bulkhead 18. Internal partial baffles 20, 22 and 24 are also provided to inhibit shifting of the bulk liquid during transport. These baffles are provided with openings, not shown, to permit liquid to flow past the baffle from one section of the compartment to another. Compartments 14 and 16 each have separate liquid inlets or loading domes 26 and 28, and separate vapor vent valves 50 and 52. The transport is provided with two hose holders 54 and 56 to provide storage for the unloading and vapor return hoses, and with a smaller diameter gauge stick holder 58. Also, a control box 60 optionally can be provided to enclose the hose connections and operating controls.

Figure 4:
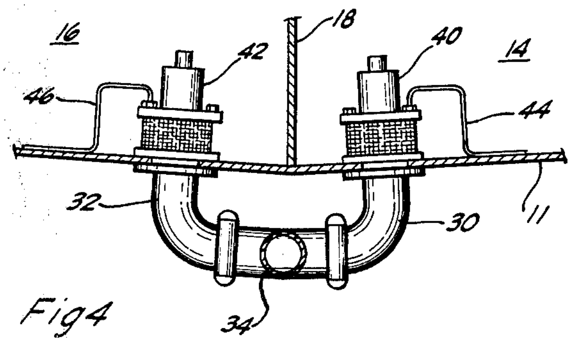
FIG. 4 is a horizontal cross-sectional view taken along the line 4—4 of FIG. 3 showing the details of the liquid outlet from the motor transport tank.
Figure 3:
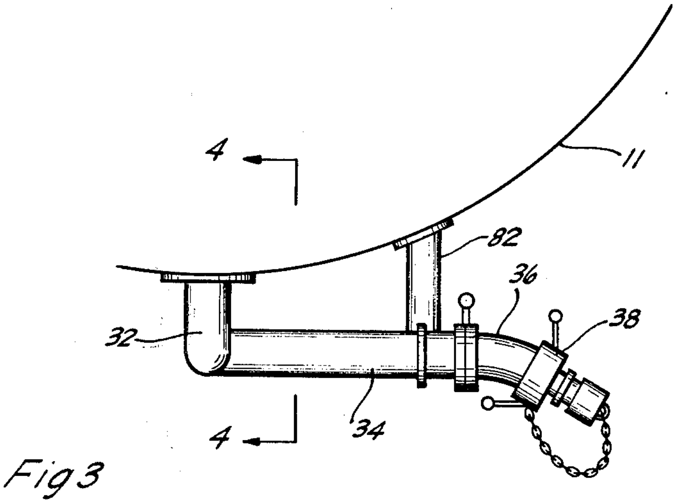
FIG. 3 is an enlarged detail view as seen from the rear showing the liquid outlet from a two compartment motor transport.

As more particularly illustrated in FIGS. 3 and 4, each compartment 14 and 16 is provided with an outlet connection 30 and 32, respectively, located preferably at the lowest point of the compartment to provide complete drainage of the liquid contents of the compartment. The outlet connections 30 and 32 are connected to the conduit 34 which is provided with a quick coupling hose adapter 36 fitted with a quick coupling dust plug 38. Each outlet connection is provided with a hydraulically or pneumatically operated internal valve 40 and 42, respectively, to control the flow through the outlet. Hydraulic oil or air under pressure is supplied through pressure conduits 44 and 46 to open the selected valve in a manner that will hereinafter be more fully described, thereby allowing liquid to flow from the individual compartment.

Figure 5:
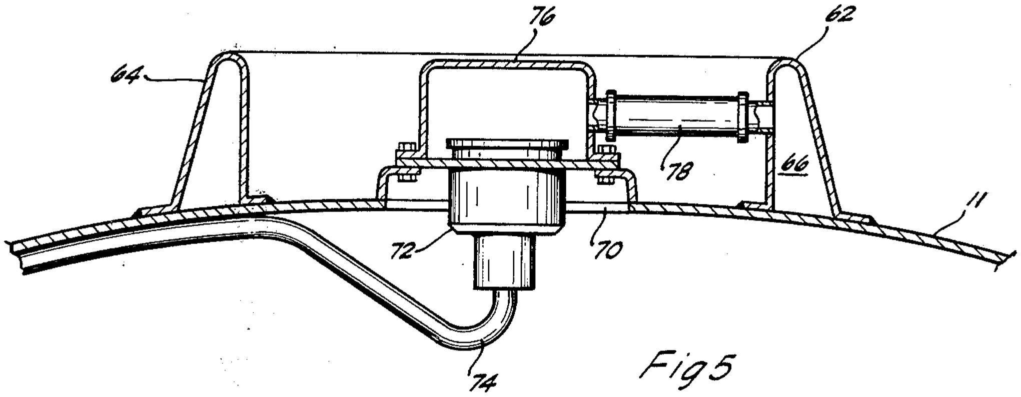
FIG. 5 is a horizontal cross-sectional view taken along the line 5—5 of FIG. 1 showing the details of the top vapor connection of a motor transport modified in accordance with the present invention.

FIG. 5 shows in greater detail the arrangement of one embodiment of the vapor recovery apparatus located at the top of each compartment. A pair of parallel hollow-form crash rails 62 and 64 extending substantially the length of tank 11 are located one at either side of the center line of the tank. These rails project above domes 26 and 28 and vent valves 50 and 52 to protect these appurtenances in the event of the transport being overturned. The rails are attached to the shell of tank 11 so as to form a fluid tight hollow-form chamber 66. An opening 70 is provided in the top of each compartment and a hydraulically or pneumatically operated vent valve 72 is installed therein to control the flow of vapor into the compartment. Hydraulic oil or air under pressure is supplied through pressure conduit 74 to a cylinder in the valve fitted with a piston that positions the valve. The valve is normally closed and is opened by means of the hydraulic oil or air supplied to the cylinder. Valve 72 is provided with a bonnet 76 connected to enclosed chamber 66 by means of flexible conduit 78. As more particularly illustrated in FIGS. 1 and 2, the chamber 66 formed by rail 64 is connected by means of vapor conduit 80 internally within tank 11 to hose connection 82 located externally of the tank.

Figure 6:
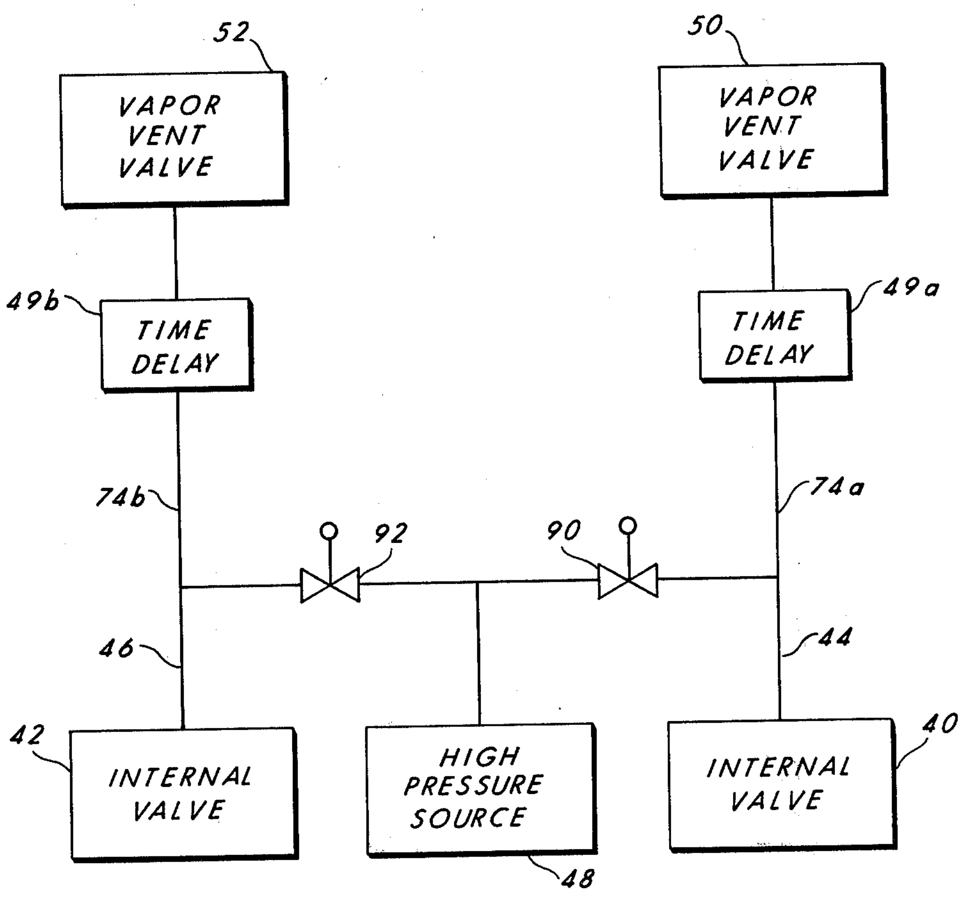
FIG. 6 is a schematic diagram illustrating the circuit used to open and close the vapor vent valves and the internal valves.

The pressure conduits conveying hydraulic fluid or compressed air to the internal valves and vent valves can be provided with remote operators that are interlocked so that both the internal valve and the vent associated with each compartment are operated by a single actuation of the remote operator. Thus, as shown in FIG. 6, pressure conduits 44 and 74*a* connected to internal valve 40 and vent valve 50, respectively, are connected to a common source of high pressure hydraulic fluid or compressed air, 48, through remote operator 90, and pressure conduits 46 and 74*b* connected to internal valve 42 and vent valve 52, respectively, are connected to the common source of hydraulic fluid or compressed air through remote operator 92. In this manner, internal valve 40 and vent valve 50 in compartment 14 can be simultaneously opened and closed by actuation of remote operator 90, and internal valve 42 and vent valve 52 in compartment 16 can be simultaneously opened and closed by actuation of remote operator 92.

In a special adaptation, time delay means, 49*a* and 49*b*, are provided in the pressure conduits 74*a* and 74*b* to each of the vent valves 50 and 52 to maintain the vent valves open for a short time period, such as a period of about 30 seconds to about 2 minutes, after the internal valve has been closed to allow the pressure in the delivery compartment and the receiving tank to equalize before the vent valve is closed. Any conventional means for achieving this time delay can be employed, one suitable means being a small orifice to restrict the bleedoff rate of the hydraulic fluid or compressed air from the valve operator controlling operation of the vent valves.

Disposed below ground surface level 100 is storage tank 102. Tank 102 is provided with liquid inlet 104 extending down through the tank to a point near the bottom thereof below the normal surface of the body of liquid 106 in the tank. Liquid inlet 104 is provided with a quick coupling hose connection 108 located in surface box 110. Underground tank 102 is also provided with a vapor outlet 112 extending from the top of the tank to the surface and terminating in box 110. Vapor outlet 112 is provided with quick coupling hose connection 114. Tank 102 is provided with an atmospheric vent 116 comprising a pipe extending from the top of tank 102 and terminating at an open end located a suitable distance above ground surface 100. Thus, vapors can be freely discharged from tank 102 to the atmosphere and air admitted into the tank through open ended vent pipe 116 so as to maintain tank 102 at essentially atmospheric pressure at all times.

In operation, the motor transport is positioned near box 110 and a portable conduit 120, such as a flexible hose, removably connected between adapter 36 of conduit 34 on the transport and connection 108 of liquid inlet 104 in box 110. Similarly, a second portable conduit 122, which can conveniently be a lightweight flexible hose, is connected from vapor conduit 82 on the transport to connection 114 of vapor outlet conduit 112 in box 110. The internal valve and the vent valve associated with the respective compartment to be unloaded are then opened by operation of the appropriate remote operator allowing the liquid in the compartment to flow through portable conduit 120 and into tank 102 below the surface of liquid 106 therein, thus minimizing splashing and agitation of the liquid during the unloading operation. As the liquid flows from the compartment being unloaded, a slight vacuum is induced in the compartment and the vapors in receiving tank 102 are displaced by the inflowing liquid through portable conduit 122 back to the same compartment of transport 10 from which liquid is being withdrawn. Since the receiving tank is at all times open to the atmosphere through vent pipe 116, the tank is maintained at essentially atmospheric pressure during the unloading operation. At the conclusion of the unloading operation, the valve operator is actuated to simultaneously close the internal valve and the vent valve, or in the case that time delay means are employed, to automatically close the vent valve at the end of the short time delay. The portable conduits can then be disconnected.

Figure 7:
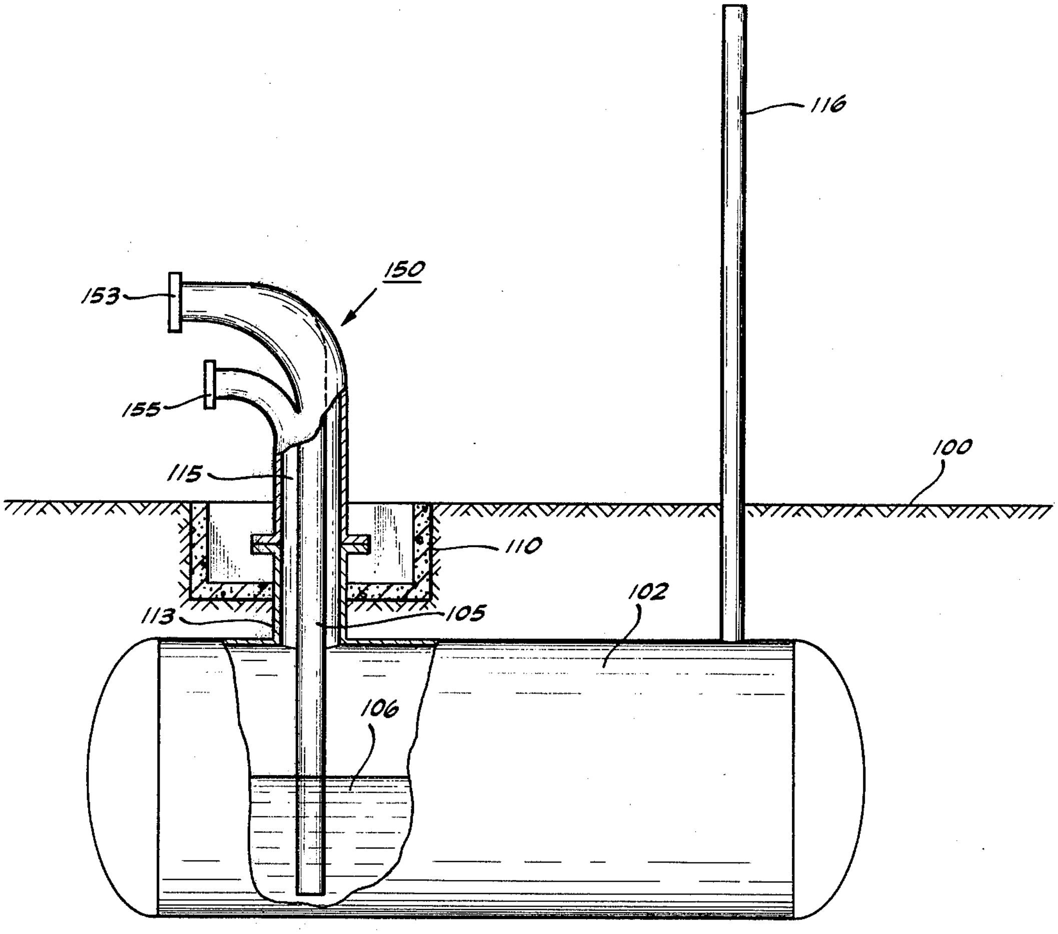
FIG. 7 is a partial cross-sectional view of an underground receiving tank equipped with a vapor-liquid coupling adapter.

FIG. 7 shows an alternative embodiment for liquid inlet 104 and vapor outlet 112 of FIG. 1. In their place are concentric pipes 113 and 105 which provide the conduits for the flow of vapor and liquid. Concentric pipe 105 is the liquid inlet and annulus 115 between concentric pipes 113 and 105 is the vapor outlet. Vapor-liquid coupling adapter 150 is removably connected to the vapor outlet and liquid inlet. Adapter 150 is designed so that portable vapor conduit 122 and portable liquid conduit 120 can be removably connected to hose connections 155 and 153, respectively.

One advantage of this invention is that the required vapor recovery apparatus can be installed on conventional equipment at relatively low cost. For example, in many cases a conventional motor transport can be modified by installation of internal vapor conduit 80 and hose connection 82, installation of the additional hose carrier 56, provision of the vapor recovery hose 122, installation of bonnets 76 on vapor valves 50 and 52, and connection of the bonnets to crash rail 62. Typically, the receiving tank need only be modified by the addition of vapor outlet 112. Underground gasoline tanks are often provided with spare nozzles in the top vapor space to which the vapor outlet piping can be readily connected, thus requiring no modification of the tank itself. Also, if desired, vapor outlet 112 can be connected to vent pipe 116, rather than directly to the tank.

It has been found that with the method and apparatus of this invention, a bulk quantity of a volatile liquid such as gasoline can be delivered to a receiving tank with no substantial loss of vapors to the atmosphere, i.e., with the loss of less than about 5 percent of the amount of vapor discharged to the atmosphere in a similar operation not employing the method and apparatus of this invention. Also, at the conclusion of the delivery the receiving tank and motor transport compartment are at essentially atmospheric pressure and the hoses can be removed with little or no vapor loss to the atmosphere. Furthermore, overpressuring of the receiving tank is avoided and little or no air is admitted into the transport tank.

Although the invention has been described with respect to the delivery of gasoline to an underground storage tank by gravity flow from a motor transport, it is to be recognized that the invention can be applied to the delivery of any volatile liquid by any type of mobile conveyance to any atmospheric receiving tank, whether located above or below ground. Also, the method is not limited to gravity flow from the delivery vessel to the receiving tank.

The invention is further illustrated by the following example which is illustrative of one specific mode of practicing the invention and is not intended as limiting the scope of the invention as defined by the appended claims.

Premium grade gasoline having a Reid vapor pressure of about 9 psig is delivered to an underground service station tank by a motor transport equipped with a vapor recovery apparatus as illustrated in the drawings. At the start of the delivery there are 4,650 gallons in the transport at a temperature of 74° F. and 3,577 gallons in the underground receiving tank at 76° F. The entire contents of the transport compartment are gravity flowed into the receiving tank in twelve minutes and the vapor displaced to the compartment being dumped. At the completion of this operation, the liquid in the receiving tank is at a temperature of 76° F.

The quantity of gas discharged from the vent pipe during the delivery operation is measured and samples of the vapor displaced to the transport compartment obtained at the start of the dump, after about one-third of the gasoline is dumped, after about two-thirds is dumped, and at the end of the dump. These samples are analyzed and the following results obtained:

| | Composition, Mol. % | | | |
|---|---|---|---|---|
| | Initial | One-Third | Two-Thirds | Final |
| Air | 52.82 | 51.13 | 50.06 | 46.74 |
| $C_1$ | 0.08 | 0.12 | 0.10 | 0.12 |
| $C_2$ | 0.10 | 0.05 | 0.07 | 0.04 |
| $C_3$ | 1.82 | 1.87 | 1.95 | 1.93 |
| $C_3{}^=$ | 0.65 | 0.86 | 0.89 | 0.88 |
| $C_4$ | 24.85 | 25.41 | 26.20 | 25.95 |
| $C_5$ | 14.54 | 15.39 | 16.24 | 15.90 |
| $C_6{}^+$ | 5.14 | 5.17 | 4.49 | 8.44 |

If this delivery had been conducted in a conventional manner without vapor recovery, approximately 622 cubic feet of vapor would be discharged to the atmosphere through the vent pipe. However, during this test only 12.6 cubic feet of gas are discharged from the vent pipe, which is equivalent to about 2 percent of that discharged in a conventional operation.

Based upon the vapor analysis obtained, the average recovery of $C_4{}^+$ hydrocarbons is calculated to be equivalent to 2.2 gallons per thousand gallons delivered. Thus, during this test, hydrocarbon vapors equivalent to about 10 gallons of liquid gasoline are returned to the transport for eventual recovery.

Various embodiments and modifications of this invention have been described in the foregoing description and example, and further modifications will be apparent to those skilled in the art. Such modifications are included within the scope of this invention as defined by the following claims.

Having now described the invention, I claim:

1. An apparatus for delivering a volatile liquid to a receiving tank, comprising:

a mobile delivery vessel having a delivery tank containing one or more compartments for the bulk storage of said volatile liquid;

liquid outlet means fluid-tightly connected to the bottom of each of said compartments and adapted to withdraw said liquid from said compartments;

one or more remotely operated liquid outlet valves operably connected to said liquid outlet means, each of said liquid outlet valves being adapted to selectively control the flow of said liquid from the corresponding one of said compartments;

vapor inlet means fluid-tightly connected to the top of each of said compartments and adapted to introduce vapor into said compartments;

one or more remotely controlled vapor inlet valves operably connected to said vapor inlet means, each of said vapor inlet valves being adapted to selectively control the flow of vapor into the corresponding one of said compartments; and valve interlock means mounted on said mobile delivery vessel and adapted to interlock the opening and closing of the liquid outlet valve and the vapor inlet valve of each of said compartments.

2. The apparatus defined in claim 1 wherein said vapor inlet means includes (a) a hollow-form rail projecting above the top of said delivery tank, said rail being fluid-tightly attached to the exterior of said delivery tank so as to form an elongated, fluid-tight chamber extending substantially the entire length of said delivery tank; (b) first conduit means communicating each of said vapor inlet valves with said elongated chamber; and (c) second conduit means communicating each of said vapor inlet valves with the top of the corresponding one of said compartments.

3. The apparatus defined in claim 1 further comprising time delay means operably connected to said vapor inlet valves and adapted to close each of said vapor inlet valves a short preselected time after the corresponding one of said liquid outlet valves is closed.

4. The apparatus defined in claim 1 further comprising coupling means for coupling said liquid outlet means to a liquid inlet conduit of said receiving tank and for coupling said vapor inlet means to a vapor outlet conduit of said receiving tank.

5. The apparatus defined in claim 1 wherein said interlock means is adapted to (a) open the corresponding one of said vapor inlet valves as soon as one of said liquid outlet valves is opened and (b) to close the corresponding one of said vapor inlet valves as soon as one of said liquid outlet valves is closed.

6. In a mobile delivery apparatus for delivering volatile liquid in bulk to a receiving tank without any substantial loss of vapors to the atmosphere which includes a delivery tank containing at least one compartment for the bulk storage of said volatile liquid; a liquid outlet connected to the bottom of each of said compartments; a liquid outlet valve in each liquid outlet to control the flow of liquid from each compartment; a vapor vent valve at the top of each of said compartments for venting the compartment to the atmosphere; means for selectively opening and closing each of said liquid outlet valves and said vapor vent valves; and a pair of parallel, hollow-form crash rails, each extending substantially the length of said delivery tank and being located one at each side of the top of said delivery tank and projecting above the top thereof, at least one of said hollow-form crash rails being fluid-tightly attached to the exterior surface of said delivery tank so as to form an elongated, fluid-tight chamber extending substantially the length of said tank; the improvement which comprises:

- a vapor inlet connection located on the exterior of said delivery tank;
- a vapor conduit communicating said vapor inlet connection with said elongated, fluid-tight chamber; and
- connecting conduit means for communicating said elongated, fluid-tight chamber with each vapor vent valve whereby said chamber is connected to each of said compartments through said vapor vent valves and said vapor vent valves communicate said compartments only to said elongated, fluid-tight chamber.

7. The apparatus defined in claim 6 wherein the connecting conduit means includes a bonnet covering each vapor vent valve so that said valves open into the interior of the respective bonnet and a connecting conduit communicating said elongated, fluid-tight chamber with the interior of each of said bonnets.

8. The apparatus defined in claim 6 wherein each liquid outlet valve and each vapor vent valve is remotely operated, and including valve operator interlock means to simultaneously open and close the liquid outlet valve and the vapor vent valve associated with each compartment.

9. The apparatus defined in claim 8 including time delay means for closing the vapor vent valve a short time period after said liquid outlet valve is closed.

* * * * *